Figure 1:
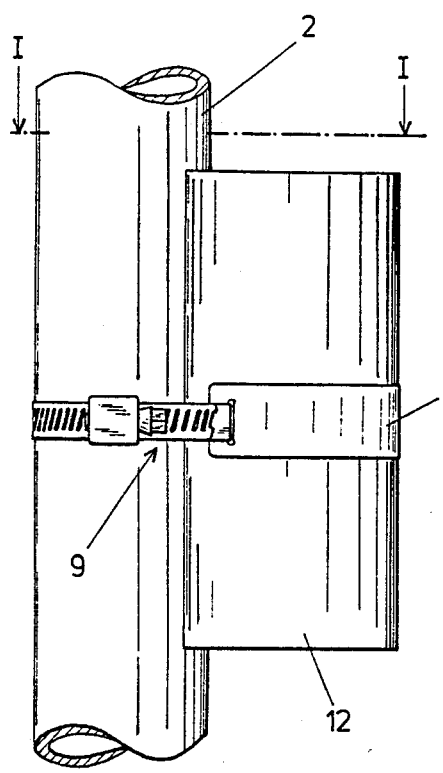

United States Patent [19]
Makovec

[11] Patent Number: 4,892,655
[45] Date of Patent: Jan. 9, 1990

[54] ARRANGEMENT FOR WATER TREATMENT

[76] Inventor: Leopold Makovec, Kalchgruben 39, A-6094 Axams, Austria

[21] Appl. No.: 116,570
[22] PCT Filed: Feb. 15, 1987
[86] PCT No.: PCT/EP87/00083
  § 371 Date: Oct. 16, 1987
  § 102(e) Date: Oct. 16, 1987
[87] PCT Pub. No.: WO87/05003
  PCT Pub. Date: Aug. 27, 1987

[30] Foreign Application Priority Data

Feb. 21, 1986 [AT] Austria ................................. 462/86

[51] Int. Cl.$^4$ ............................................. C02F 1/48
[52] U.S. Cl. ..................................... 210/222; 210/695
[58] Field of Search .................... 335/209, 219, 297;
        210/222, 223, 695; 209/232

[56] References Cited

U.S. PATENT DOCUMENTS

| | | | |
|---|---|---|---|
| 2,939,830 | 6/1960 | Green | 210/222 |
| 3,626,343 | 12/1971 | Bohlke | 335/297 |
| 3,842,379 | 10/1974 | Barnett | 335/297 |
| 4,226,720 | 10/1980 | Brigante | 210/222 |
| 4,288,323 | 9/1981 | Brigante | 210/222 |
| 4,299,701 | 11/1981 | Garrett et al. | 210/222 |
| 4,608,547 | 8/1986 | Iron | 335/297 |

FOREIGN PATENT DOCUMENTS

| | | | |
|---|---|---|---|
| 166238 | 6/1950 | Austria . | |
| 176517 | 3/1953 | Austria . | |
| 183699 | 3/1955 | Austria . | |
| 191810 | 9/1957 | Austria . | |
| 267422 | 3/1968 | Austria . | |
| 373569 | 6/1983 | Austria . | |
| 1155086 | 10/1983 | Canada . | |
| 0057500 | 8/1984 | European Pat. Off. . | |
| 1045546 | 12/1958 | Fed. Rep. of Germany | 335/297 |
| 1811114 | 6/1970 | Fed. Rep. of Germany . | |
| 2803066 | 7/1979 | Fed. Rep. of Germany . | |
| 341230 | 11/1957 | Switzerland | 335/297 |
| 2017074 | 9/1979 | United Kingdom . | |

*Primary Examiner*—W. Gary Jones
*Attorney, Agent, or Firm*—Toren, McGeady & Associates

[57] ABSTRACT

For treating water, there is used a magnetic field generated by an electromagnet (1). To this effect, an electromagnet (1) having at least one exciting coil (4) and a U-shaped or E-shaped iron core (3) is attached to the outer top surface of a water conducting pipe (2). The free projecting branches (5 6 7) of the iron core (3) are pressed against the pipe (2), one after the other in the direction of its length. In order to avoid the formation of an airgap between the pipe (2) and the free ends of the branches (5 6 7), the latter are adapted or adaptable to the curvature of the surface of the pipe (2).

10 Claims, 2 Drawing Sheets

ARRANGEMENT FOR WATER TREATMENT

The invention is directed to an arrangement for water treatment with a magnetic field generated by an electromagnet wherein an electromagnet with at least one excitation coil can be applied to the external surface of a pipe carrying water.

It is known to direct potable water in pipes carrying water in such a way through the magnetic lines of force of a solenoid in order to avoid calcareous sediments or furring, so that said water repeatedly intersects the lines of force of said solenoid. The magnetic field through which the potable water is directed distorts or influences the water molecules which are composed of one oxygen and two hydrogen atoms. Because of the influence of the magnet the electron from the respective inner electron circuit is urged into the outer circuit. Viewed physically the atomic lattice is destroyed by this action. Pieces of lime are split into microfine particles, they are changed as far as their crystalline structure is concerned and thus they lose the property to deposit themselves as sediment. This means that the lime shares are held in suspension and are eliminated together with the flowing water.

A whole series of arrangements for appliances are known which build up a magnetic field in pipes carrying water and thus appropriately affect the passing potable water. These are complicated structures as a rule, which have to be separately built into the water pipeline network or however the excitation coils embrace the pipes carrying water, which naturally also leads to expensive manipulation in the water supply system.

It is also known to attach a permanent magnet at the external side of a pipe. The use of a permanent magnet for such an arrangement is inappropriate, because the danger of a line blockage exists due to the field of magnetic force always remaining constant, particularly since iron particles carried in the water are attracted to the region of the applied permanent magnet. This danger of clogging can only be avoided by arranging an electromagnet with an excitation coil and thus with the possibility of connecting same to a source of pulsating direct current. Furthermore the effect of this permanent magnet is impaired since the contact surface of same extends tangentially to the surface of the pipe.

The present invention has set itself the task to create an arrangement of the previously described type, which enables to exploit the advantages of an optimum effect of magnetic fields upon the flowing water without any reconstruction in the water supply system being required.

The arrangement proposed for solving the problem is characterized by the electromagnet comprising a U- or E-shaped iron core, whose freely projecting legs can be pressed against the pipe consecutively across its longitudinal extent, wherein the free ends of the legs are matched or are matchable to the surface curvature of the pipe.

Thus a magnetic field of force can be built up at any random point of the pipe carrying water by means of the measures in the invention, without that extensive disassembly or installation work has to be performed at the pipelines themselves. Therefore an electromagnet can be directly applied to the surface of a pipe carrying water in accordance with the invention, wherein tests have shown that the effect of such an arrangement is an optimum one. Because of the feature of the invention that the free ends of the legs of the iron core are matched or are matchable to the surface curvature of the pipe, it is always assured that no air gap is formed between the legs of the iron core and the pipe carrying water, so that no weakening of the magnetic field of force occurs. Only by means of these additional measures it became possible to perform a simple application of an electromagnet to a pipe carrying water.

Favorable acquisition and installation costs made possible by the inventive arrangement are also worth mentioning, since the water supply system does not have to be interrupted during the installation of our arrangement.

Other characteristics of the invention and special advantages are explained with particularity in the following description with the help of the drawings.

Figure 2:
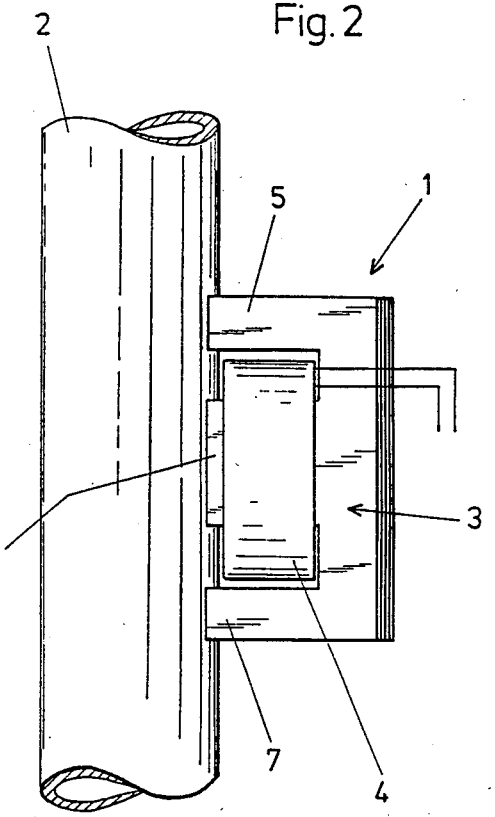
Figure 3:
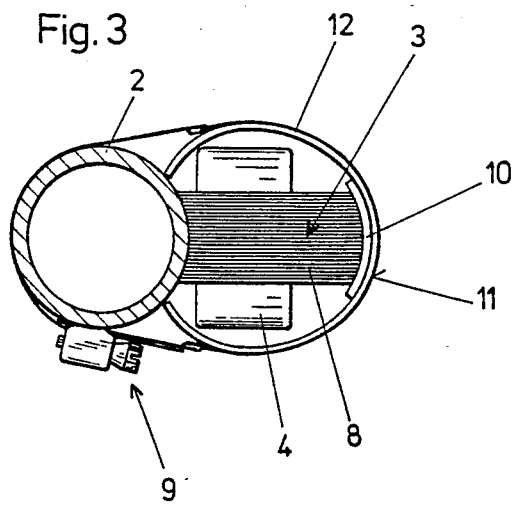
Figure 4:
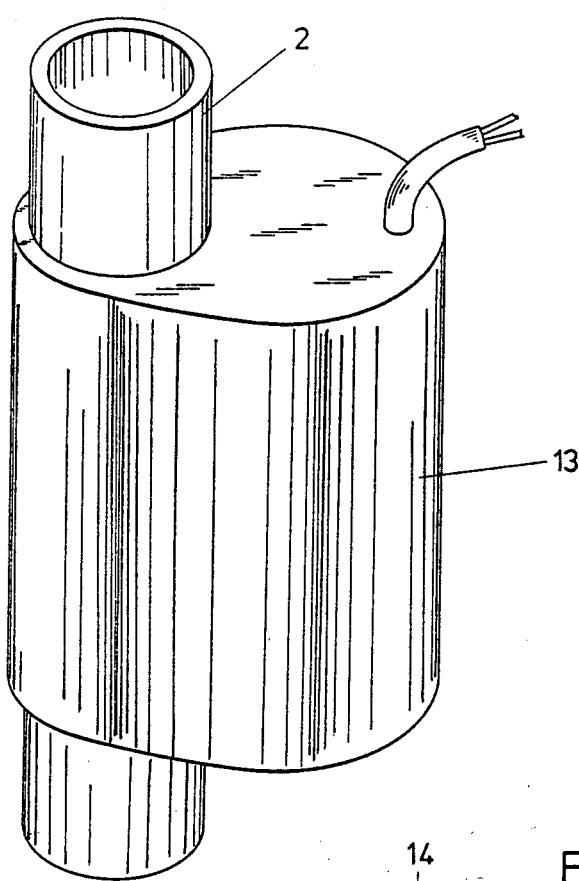
Figure 5:
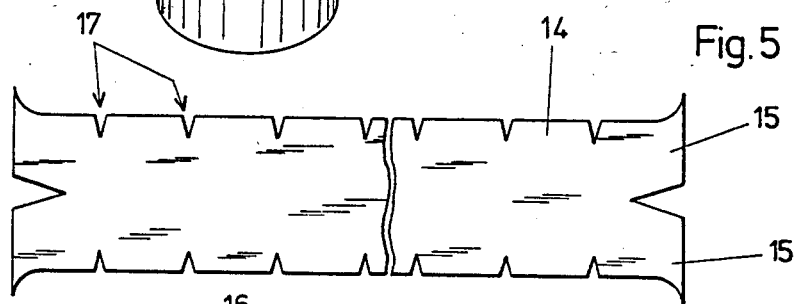
Figure 6:
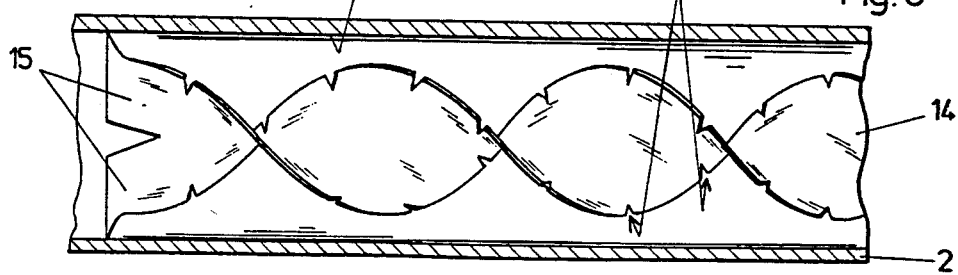

It is shown on:

FIG. 1 a front view of a pipe with the arrangement applied;

FIG. 2 the same view, however with the clamping and housing removed;

FIG. 3 a section along the line I—I in FIG. 1;

FIG. 4 an additional embodiment example of the invention;

FIG. 5 a piece of flat material for insertion inside the pipe;

FIG. 6 a section through a pipe with an inserted piece of flat material coiled around the longitudinal axis of said pipe.

The arrangement in the invention consists of an electromagnet 1 which can be applied to a pipe 2 carrying water. A pipe 2 carrying water is always being discussed here. The arrangement in the invention can be attached in the same manner to any implement carrying water, as for instance a container or an appliance carrying water.

The electromagnet 1 consists of an E-shaped iron core 3 and an exciter coil 4. The freely projecting legs 5, 6 and 7 can be pressed against the pipe 2.

It is also possible in the framework of the invention to utilize a U-shaped iron core 3 comprising merely two legs. Embodiments are however conceivable where more than three such legs 5, 6 and 7 are arranged, wherein then correspondingly several exciter coils 4 have to be provided. It is also possible to arrange several such U- or E-shaped iron cores consecutively in a row and to connect them in some way mechanically with each other. It is also possible to install several such electromagnets one behind the other at the pipe carrying water or for instance to arrange them angularly offset with respect to each other but consecutively at a pipe 2.

A essential feature of the invention is that the free ends of the legs 5, 6 and 7 are matched or are matchable to the surface curvature of the pipe 2. In appropriately adapted versions it must be determined from the beginning for which pipe diameters a specific iron core 3 is suitable. So as to achieve a simple adaptability to varying pipe diameters and thus to the most differing surface curvatures of the pipe 2, the iron core 3 is fabricated from a plurality of sheet metal plates 8 arranged in layer-like fashion, which are displaceable relative to each other in direction of the legs 5, 6, 7. This feature makes it possible that all sheet metal plates come to rest snugly in the region of the free ends of the legs 5, 6 and 7 and the surface of the pipe 2. This excludes the formation of an air gap and in this manner assures an orderly configuration of the magnetic lines of force inside the pipe 2 carrying water.

The relative displacement of the sheet metal plates of the iron core 3 can be achieved in a simple manner when clamping the electromagnet 1 to the pipe 2 carrying water. A commercially available clamp 9 can be utilized for clamping the electromagnet 1 to the pipe 2, the clamp being for instance of the type of a hose clamp. This permits to attain a sufficient contact pressure of the free ends of the legs 5, 6, 7 at the pipe 2 by an appropriately strong tightening of the clamp. So as to achieve a favorable load distribution in the region of the iron core 3 and thus of the plates 8, an elastic contact strip 10 is inserted between the iron core 3 and a portion 11 of the clamp 9 which is for instance strip-shaped.

The electromagnet 1 is appropriately covered by a housing 12, which overlaps the contact strip 10 and is open only at the contact side of the legs 5, 6, 7. The portion comprising the electromagnet 1 can therefore be protected externally, so that no additional installation or protective measures are required. This housing 12 can also be closed on the front side by appropriate cover parts, whereby the electric supply line can be passed through an appropriate aperture to the outside.

In the embodiment in FIG. 4 the electromagnet after having been clamped to the pipe 2 is cast into a block-shaped protective member 13. This enables an excellent insulation of the part and an immovable fixation of the arrangement on the pipe 2. By arranging an appropriate mould member this protective member 13 can be fabricated at the site by filling the mould with foam.

It is also possible in this connection to fabricate such an arrangement separately, wherein then a short piece of pipe 2 with appropriate connecting ends is cast into and together with this block-shaped protective member 13. Such an arrangement is particularly appropriate when an initial installation of a water supply system is being envisaged. In such a case this piece of pipe 2 is fabricated from a non-magnetic material for instance aluminum.

The coil member 4 of the electromagnet is connected to a source of pulsating direct current, wherein a suitable diode is utilized for this purpose. This pulsating direct current prevents a clogging of the water line system by attracted iron particles.

A useful addition is recognizable in FIGS. 5 and 6, which enables the water contained in pipe 2 to be imparted a turbulent vortex motion in the region of the electromagnet, thus increasing the effect of the magnetic field by the formation of these vortices. We are dealing here with a simple design, wherein a piece of flat material 14 from non-magnetic material is non-displaceably inserted into the pipe so as to be coiled or twisted around its longitudinal axis. FIG. 5 depicts such a piece of flat material 14 still in its flat state. FIG. 6 shows how this piece of flat material 14 is twisted around its longitudinal axis. The ends of this twisted piece of flat material 14 are spread out, wherein the projecting end parts 15 are pressed against the inside wall 16 of the pipe 2. In this manner the inserted piece of flat material 14 is retained securely and undisplaceably inside the pipe 2. In order to increase the formation of said vortices in the flowing water jagged cutouts 17 can be fashioned in the longitudinal edge regions of the twisted piece of flat material 14. In addition or instead of these cutouts 17 it is also possible to provide projecting ribs, webs or the like or however appropriate bores in the piece of flat material 14. Precisely by this arrangement which can be applied externally to a pipe a carrying water a very simple possibility to activate the water in the line system has been achieved. Thus an optimum treatment of water can occur with means which are simple in design without extensive installation work and without addition of chemicals or other additives to the potable water. Tests have shown that water treated in this manner remains highly active for at least three hours, wherein this activity drops to zero within 24 hours. Experience has shown however that water in the installation system is renewed two to three times a day. The arrangement in the invention prevents with certainty deposits in the line system area and also for example in a boiler or other appliances carrying water. Sediments which exist already are decomposed.

It has also been shown that by treating the water by an electric magnetic field a considerable saving of various detergents, or laundry softeners is possible.

Because of the design of the legs of the iron core so as to be adaptable to surface curvatures the arrangement in the invention is also optimized for adaptable application to portions of the body of humans and animals. It has already been seen many years ago that an electromagnetic field assists in the promotion of healing processes, and indeed especially in case of bone fractures. This healing effect is additionally magnified by the adaptability to a surface shape.

I claim:

1. Arrangement for treatment of water by a magnetic field the arrangement comprising in combination an electromagnet and a pipe carrying water, the pipe having an external surface with a surface curvature and a longitudinal direction, the electromagnet having at least one exciter coil and being applied to the external surface of the pipe carrying water, the electromagnet having a U- or E-shaped iron core (3) with freely projecting legs (5, 6, 7), the legs being pressed against the pipe (2) consecutively in longitudinal direction of the pipe, the legs (5, 6, 7) having free ends with end surfaces facing the pipe, each end surface having a shape and means for matching said shape to the surface curvature of the pipe (2) comprising the iron core (3) being constituted by layered sheet metal plates (8) which are displaceable relative to each other in direction of the legs (5, 6, 7).

2. Arrangement according to claim 1, comprising a clamp for clamping the electromagnet (1) to the pipe (2), the clamp embracing said magnet and said pipe.

3. Arrangement according to claim 2 comprising an elastic contact strip (10) inserted between the iron core (3) constituted by the plates (8) and the clamp (9).

4. Arrangement according to claim 3, comprising a housing (12) open at the side at which the legs (5, 6, 7) are applied to the pipe, the housing covering the electromagnet (1) and the contact strip (10).

5. Arrangement according to claim 4, wherein the clamp (9) embraces the housing (12) and the pipe (2) and the contact strip (10) is inserted between the iron core (3) and the housing (12).

6. Arrangement according to claim 2, wherein the electromagnet clamped to the pipe (2) is cast into a block shaped protective member (13).

7. Arrangement according to claim 6, wherein a short piece of the pipe (2) is cast into the block-shaped protective member (13), the piece of pipe having connection ends adapted for connection to a water supply system.

8. Arrangement according to claim 7, wherein the piece of pipe (2) is non-magnetic material.

9. Arrangement according to claim 8, wherein the non-magnetic material is aluminum.

10. Arrangement according to claim 2, wherein the clamp (9) is a hose clamp.

* * * * *